United States Patent
Harada

(10) Patent No.: US 10,418,185 B2
(45) Date of Patent: Sep. 17, 2019

(54) SOLID ELECTROLYTIC CAPACITOR ELEMENT, SOLID ELECTROLYTIC CAPACITOR, METHOD FOR PRODUCING SOLID ELECTROLYTIC CAPACITOR ELEMENT, AND METHOD FOR PRODUCING SOLID CAPACITOR

(71) Applicant: Murata Manufacturing Co., Ltd., Nagaokakyo-shi, Kyoto-fu (JP)

(72) Inventor: Hiroyuki Harada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/682,994

(22) Filed: Aug. 22, 2017

(65) Prior Publication Data

US 2018/0061585 A1 Mar. 1, 2018

(30) Foreign Application Priority Data

Aug. 25, 2016 (JP) .................................. 2016-164736

(51) Int. Cl.
*H01G 9/15* (2006.01)
*H01G 9/00* (2006.01)
*H01G 9/012* (2006.01)
*H01G 9/07* (2006.01)
*H01G 9/10* (2006.01)
*H01G 9/028* (2006.01)

(52) U.S. Cl.
CPC ............. *H01G 9/15* (2013.01); *H01G 9/0032* (2013.01); *H01G 9/012* (2013.01); *H01G 9/07* (2013.01); *H01G 9/10* (2013.01); *H01G 9/0036* (2013.01); *H01G 9/028* (2013.01)

(58) Field of Classification Search
CPC ............ H01G 9/012; H01G 9/07; H01G 9/12; H01G 9/15; H01G 9/028; H01G 9/042; H01G 9/0032; H01G 9/0036
See application file for complete search history.

(56) References Cited

U.S. PATENT DOCUMENTS

| | | |
|---|---|---|
| 6,771,488 B2 | 8/2004 | Takagi |
| 6,775,126 B2 | 8/2004 | Fujii et al. |
| 8,014,129 B2 | 9/2011 | Saito et al. |

(Continued)

FOREIGN PATENT DOCUMENTS

| | | |
|---|---|---|
| CN | 1499548 A | 5/2004 |
| JP | 2009158692 A | 7/2009 |

*Primary Examiner* — Nguyen T Ha
(74) *Attorney, Agent, or Firm* — Arent Fox LLP

(57) ABSTRACT

A solid electrolytic capacitor element that includes a valve metal substrate having an anode terminal region and a cathode-forming region; a dielectric layer on the cathode-forming region; a solid electrolyte layer on the dielectric layer; a current collector layer on the solid electrolyte layer; and a masking member between the anode terminal region and cathode-forming region to insulate the substrate from opposite polarity. The masking region includes a first coating portion, an exposed region exposing the dielectric layer, and a second coating portion arranged in this order starting from a boundary between the anode terminal region and the cathode-forming region towards the anode terminal region. The solid electrolyte layer covers the first coating portion and at least a portion of the exposed region.

10 Claims, 5 Drawing Sheets

(56) References Cited

U.S. PATENT DOCUMENTS

| | | | |
|---|---|---|---|
| 8,379,369 B2 | 2/2013 | Fukunaga et al. | |
| 8,437,117 B2 | 5/2013 | Umemoto | |
| 8,625,254 B2 | 1/2014 | Takahashi | |
| 9,236,193 B2 | 1/2016 | Tatsuno | |
| 2002/0003689 A1* | 1/2002 | Sakai | H01G 9/0029 361/525 |
| 2002/0167786 A1 | 11/2002 | Sano | |
| 2004/0130856 A1 | 7/2004 | Fujii et al. | |
| 2006/0084237 A1 | 4/2006 | Kobayashi | |
| 2009/0061309 A1* | 3/2009 | Ushio | H01G 9/016 429/185 |
| 2009/0168304 A1 | 7/2009 | Saito et al. | |
| 2009/0316338 A1 | 12/2009 | Park | |
| 2010/0103589 A1* | 4/2010 | Fukunaga | H01G 9/0032 361/524 |
| 2010/0103590 A1* | 4/2010 | Saida | C08G 61/126 361/525 |
| 2010/0136222 A1 | 6/2010 | Furukawa | |
| 2011/0026190 A1 | 2/2011 | Oohata | |
| 2011/0157776 A1* | 6/2011 | Ishida | H01G 9/0029 361/524 |
| 2012/0125674 A1* | 5/2012 | Miyahara | H01G 2/06 174/260 |
| 2015/0155101 A1 | 6/2015 | Araki | |
| 2015/0194270 A1* | 7/2015 | Katsube | H01G 9/15 174/257 |
| 2015/0357122 A1* | 12/2015 | Matsubara | H01G 9/15 361/528 |
| 2016/0071654 A1* | 3/2016 | Kimura | H01G 9/14 361/528 |
| 2016/0196924 A1* | 7/2016 | Tokuhara | H01G 9/028 216/6 |

* cited by examiner

SOLID ELECTROLYTIC CAPACITOR ELEMENT, SOLID ELECTROLYTIC CAPACITOR, METHOD FOR PRODUCING SOLID ELECTROLYTIC CAPACITOR ELEMENT, AND METHOD FOR PRODUCING SOLID CAPACITOR

CROSS REFERENCE TO RELATED APPLICATIONS

The present application claims priority to Japanese Patent Application No. 2016-164736, filed Aug. 25, 2016, the entire contents of which are incorporated herein by reference.

BACKGROUND OF THE INVENTION

Field of the Invention

The present invention relates to a solid electrolytic capacitor element, a solid electrolytic capacitor, a method for producing a solid electrolytic capacitor element, and a method for producing a solid electrolytic capacitor.

Description of the Related Art

A solid electrolytic capacitor includes, for example, a solid electrolytic capacitor element prepared by forming an oxide coating film that constitutes a dielectric layer on a roughened surface of a valve metal substrate, forming a masking layer to separate an anode portion and a cathode portion from each other, and sequentially forming, on the dielectric layer outside the anode portion, a solid electrolyte layer, and a carbon paste layer and a silver paste layer that constitute a current collector layer as described in Japanese Unexamined Patent Application Publication No. 2009-158692, for example.

However, typical solid electrolytic capacitors such as one disclosed in Japanese Unexamined Patent Application Publication No. 2009-158692 sometimes have an issue of large leak current.

FIGS. 7A and 7B are schematic cross-sectional views of an example of a solid electrolytic capacitor element included in a typical solid electrolytic capacitor.

A solid electrolyte layer 40 and a current collector layer 50 constituting a typical solid electrolytic capacitor element 6 are typically each prepared by immersing one end portion of a valve metal substrate 10, where a cathode portion will be formed, in a raw material solution or dispersion of a conductive polymer, carbon paste, or the like.

However, when the valve metal substrate 10 is immersed in the raw material solution or dispersion of a conductive polymer for forming a solid electrolyte layer 40, a masking member 35 repels the raw material solution or dispersion. As illustrated in FIG. 7A, this sometimes results in formation of a gap between the masking member 35 and the solid electrolyte layer 40.

When carbon paste or the like is applied to the solid electrolyte layer 40 under such conditions so as to form a current collector layer 50, carbon paste penetrates the gap, and, as illustrated in FIG. 7B, the current collector layer 50 comes into contact with a dielectric layer 20. It is considered that the leak current will increase as a result.

SUMMARY OF THE INVENTION

The present invention has been made to address the aforementioned issues. An object of the present invention is to provide a solid electrolytic capacitor element with which leak current is suppressed.

Preferred embodiments of the present invention provide a solid electrolytic capacitor element that includes a valve metal substrate that has an anode terminal region and a cathode-forming region; a dielectric layer on the cathode-forming region; a solid electrolyte layer on the dielectric layer; a current collector layer on the solid electrolyte layer; and a masking member partitioning between the anode terminal region and the cathode-forming region and insulating the valve metal substrate from opposite polarity. The masking member includes a first coating portion, an exposed region where the dielectric layer is exposed, and a second coating portion. The first coating portion, the exposed region, and the second coating portion are arranged in this order starting from a boundary between the anode terminal region and the cathode-forming region towards the anode terminal region. The solid electrolyte layer covers the first coating portion and at least a portion of the exposed region.

As illustrated in FIG. 1 described below, the solid electrolytic capacitor element according to preferred embodiments of the present invention includes an exposed region 32 where a dielectric layer 20 is exposed, and the exposed region 32 lies in a masking region 30. A solid electrolyte layer 40 is formed so as to cover the entirety of a first coating region 31 and at least a portion of the exposed region 32. Thus, a gap, such as one illustrated in FIG. 7A, is not formed between the first coating region 31 and the solid electrolyte layer 40. It is considered that due to this feature, leak current is suppressed.

Preferably, the masking member has a height of about 50 μm or less. When the masking member has a height exceeding about 50 μm, the capacitor element is excessively large and the capacitance per volume may decrease.

Preferably, the solid electrolytic capacitor element further includes a hydrophilic member provided on a surface of the portion of the masking member that constitutes the first coating region. When a hydrophilic member is provided on the surface of the portion of the masking member that constitutes the first coating region, the first coating region rarely repels a raw material solution or dispersion of a conductive polymer for forming the solid electrolyte layer. Thus the solid electrolyte layer is smoothly formed on the first coating region.

Preferably, the hydrophilic member contains at least one selected from the group consisting of a silane coupling agent, a metal chelating agent, and a wetting agent.

The silane coupling agent, the metal chelating agent, and the wetting agent can all impart sufficient hydrophilicity to the masking member.

Preferably, the silane coupling agent is at least one selected from the group consisting of 3-glycidyloxypropyltrimethoxysilane and 3-aminopropyltrimethoxysilane.

These silane coupling agents can impart sufficient hydrophilicity to the surface of the masking member.

Preferably, the metal chelating agent is at least one selected from the group consisting of 8-quinolinol, 1,2,3-benzotriazole, and 1,3-diphenyl-1,3-propanedione.

These metal chelating agents can impart sufficient hydrophilicity to the surface of the masking member.

Preferably, the solid electrolytic capacitor element further includes a hydrophobic member on a surface of the portion of the masking member that constitutes the second coating region.

When a hydrophobic member is on a surface of the portion of the masking member that constitutes the second coating region, the second coating region easily repels a raw material solution or dispersion of a conductive polymer for forming a solid electrolyte layer. Thus, a solid electrolyte layer is rarely formed on the second coating region.

Preferably, at least a portion of the solid electrolyte layer formed on the masking region is not covered with the current collector layer and exposed.

When the solid electrolyte layer formed on the masking region is at least partly left uncovered with the current collector layer and exposed, the current collector layer and the dielectric layer are prevented from coming into direct contact with each other in the exposed region.

Preferably, an entirety of the solid electrolyte layer formed on the dielectric layer on the cathode-forming region is covered with the current collector layer.

When the entirety of the solid electrolyte layer formed on the dielectric layer on the cathode-forming region is covered with the current collector layer, the electron spin resonance (ESR) of the solid electrolytic capacitor element can be sufficiently decreased.

Preferred embodiments of the present invention provide a solid electrolytic capacitor that includes the solid electrolytic capacitor element described above, and a packaging resin that seals the solid electrolytic capacitor element.

Preferred embodiments of the present invention provide a method for producing a solid electrolytic capacitor element. The method includes a step of forming a dielectric layer on surfaces of a valve metal substrate; a step of forming a masking member on the valve metal substrate so as to partition the valve metal substrate into an anode terminal region and a cathode-forming region; a step of forming a solid electrolyte layer on a portion of the masking member and on the dielectric layer; and a step of forming a current collector layer on the solid electrolyte layer. In the step of forming the masking member, an exposed region where the dielectric layer is exposed is formed in a region other than end portions of the masking region. In the step of forming a solid electrolyte layer, the solid electrolyte layer is formed so as to extend from a boundary between the anode terminal region and the cathode-forming region to at least a portion of the exposed region of the dielectric layer.

According to this method, a coating region that includes a masking member and an exposed region where a dielectric layer is exposed are formed as a masking region. During this process, the exposed region is formed in the region other than end portions of the masking region. Thus, as long as a solid electrolyte layer that covers a region that extends from the boundary between the anode terminal region and the cathode-forming region to at least a portion of the exposed region is formed, no gap is formed between the solid electrolyte layer and the coating region that lies on the cathode-forming-region-side of the exposed region. As a result, a solid electrolytic capacitor element with less leak current can be produced.

Preferably, the masking member has a height of about 50 μm or less.

When the masking member has a height of about 50 μm or less, a small solid electrolytic capacitor element can be produced.

The method may further include, after the step of forming a masking region, a step of providing a hydrophilic member on a surface of a portion of the masking member that constitutes a first coating region formed on a cathode-forming region side from the exposed region of the dielectric layer.

When the hydrophilic member is provided on a surface of a portion of the masking member that constitutes a coating region formed on a cathode-forming-region-side of the exposed region, this coating region rarely repels a raw material solution or dispersion of a conductive polymer for forming a solid electrolyte layer. Thus, a solid electrolyte layer can be smoothly formed on this coating region.

Preferably, the hydrophilic member contains at least one selected from the group consisting of a silane coupling agent, a metal chelating agent, and a wetting agent.

The silane coupling agent, the metal chelating agent, and the wetting agent can all impart sufficient hydrophilicity to the masking member.

Preferably, the silane coupling agent is at least one selected from the group consisting of 3-glycidyloxypropyltrimethoxysilane and 3-aminopropyltrimethoxysilane.

These silane coupling agents can impart sufficient hydrophilicity to the surface of the masking member.

Preferably, the metal chelating agent is at least one selected from the group consisting of 8-quinolinol, 1,2,3-benzotriazole, and 1,3-diphenyl-1,3-propanedione.

These metal chelating agents can impart sufficient hydrophilicity to the surface of the masking member.

The method may further include, after the step of forming a masking region, a step of providing a hydrophobic member on a surface of a portion of the masking member that constitutes a second coating region formed on an anode terminal region side from the exposed region of the dielectric layer.

When the hydrophobic member is provided on a surface of a portion of the masking member that constitutes a coating region formed on the anode-terminal-region-side of the exposed region, this coating region easily repels a raw material solution or dispersion of a conductive polymer for forming the solid electrolyte layer. Thus the solid electrolyte layer is rarely formed on this coating region.

Preferably, in the step of forming a current collector layer, at least a portion of the solid electrolyte layer formed on the masking region is not covered with the current collector layer and exposed.

When the solid electrolyte layer formed on the masking region is at least partly left uncovered with the current collector layer and exposed, the current collector layer and the dielectric layer are prevented from coming into direct contact with each other.

Preferably, in the step of forming a current collector layer, an entirety of the solid electrolyte layer formed on the dielectric layer on the cathode-forming region is covered with the current collector layer.

When the entirety of the solid electrolyte layer formed on the dielectric layer on the cathode-forming region is covered with the current collector layer, the ESR of the solid electrolytic capacitor element can be sufficiently decreased.

Preferred embodiments of the present invention provide a method for producing a solid electrolytic capacitor. The method include a step of preparing a solid electrolytic capacitor element by the method described above; and a step of sealing the solid electrolytic capacitor element with a packaging resin.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

A solid electrolytic capacitor element and a solid electrolytic capacitor according to preferred embodiments of the present invention will now be described.

It is to be noted that the present invention is not limited to the structures described below and is subject to various modifications and alterations without departing from the gist of the invention. Any combination of two or more preferable structures of the present invention described below is also within the scope of the present invention.

Solid Electrolytic Capacitor Element

First, a solid electrolytic capacitor element according to preferred embodiments of the present invention is described.

A solid electrolytic capacitor element according to preferred embodiments of the present invention includes a valve metal substrate that has an anode terminal region and a cathode-forming region; a dielectric layer on the cathode-forming region; a solid electrolyte layer on the dielectric layer; a current collector layer on the solid electrolyte layer; and a masking region to insulate the valve metal substrate from opposite polarity.

Figure 1:
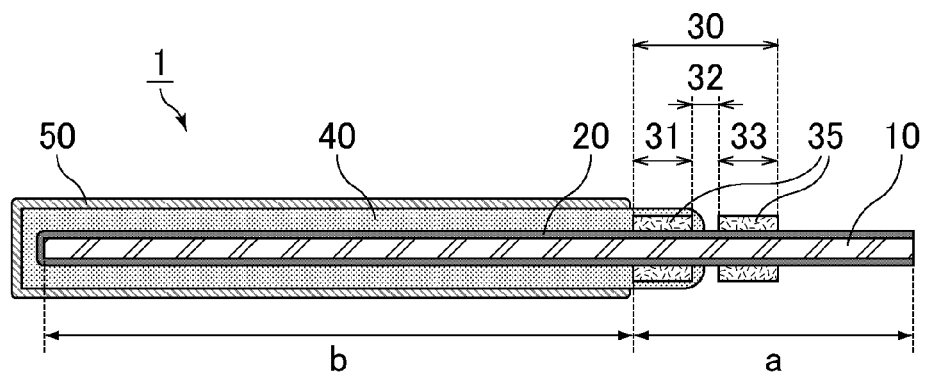
FIG. 1 is a schematic cross-sectional view of an example of a solid electrolytic capacitor element according to preferred embodiments of the present invention.

FIG. 1 is a schematic cross-sectional view of an example of a solid electrolytic capacitor element according to preferred embodiments of the present invention.

A solid electrolytic capacitor element 1 illustrated in FIG. 1 includes a valve metal substrate 10 having an anode terminal region (a region indicated by double-headed arrow a in FIG. 1) and a cathode-forming region (a region indicated by double-headed arrow b in FIG. 1); a dielectric layer 20 formed on the anode terminal region a and the cathode-forming region b; a solid electrolyte layer 40 formed on the dielectric layer 20; and a current collector layer 50 formed on the solid electrolyte layer 40. A masking region 30 that includes masking members 35 is formed on the anode terminal region a so as to partition between the anode terminal region a and the cathode-forming region b and to insulate the valve metal substrate 10 from opposite polarity. The masking region 30 includes a first coating region 31 that includes one of the masking members 35, an exposed region 32 where the dielectric layer 20 is exposed, and a second coating region 33 that includes the other masking member 35. The first coating region 31, the exposed region 32, and the second coating region 33 are arranged in this order starting from the boundary between the anode terminal region a and the cathode-forming region b towards the anode terminal region a.

The solid electrolyte layer 40 covers the entirety of the first coating region 31 and at least a portion of the exposed region 32.

Figure 2:
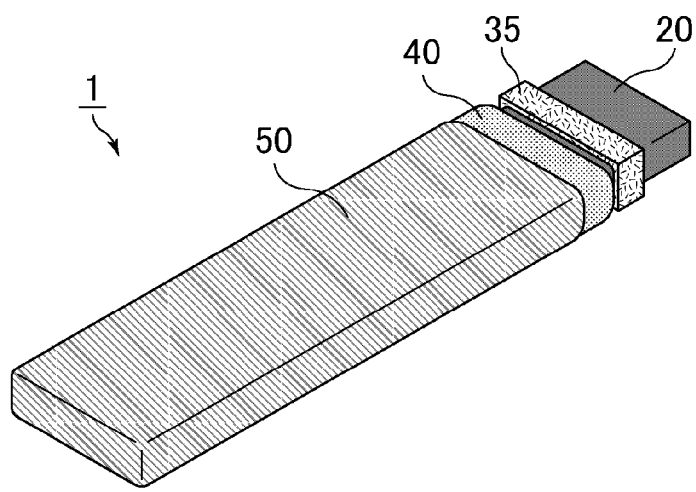
FIG. 2 is a perspective view of a solid electrolytic capacitor element 1 illustrated in FIG. 1.

FIG. 2 is a perspective view of the solid electrolytic capacitor element 1 illustrated in FIG. 1.

As illustrated in FIG. 2, the masking member 35 the constitutes the second coating region 33 in FIG. 1 is provided around the valve metal substrate having the dielectric layer 20 formed on surfaces thereof. Although not illustrated in FIG. 2, the masking member 35 that constitutes the first coating region 31 in FIG. 1 is also provided around the valve metal substrate having the dielectric layer 20 formed on surfaces thereof. In the solid electrolytic capacitor element 1 illustrated in FIGS. 1 and 2, the exposed region 32 has a ring shape and is disposed between the two masking members 35.

Figure 3:
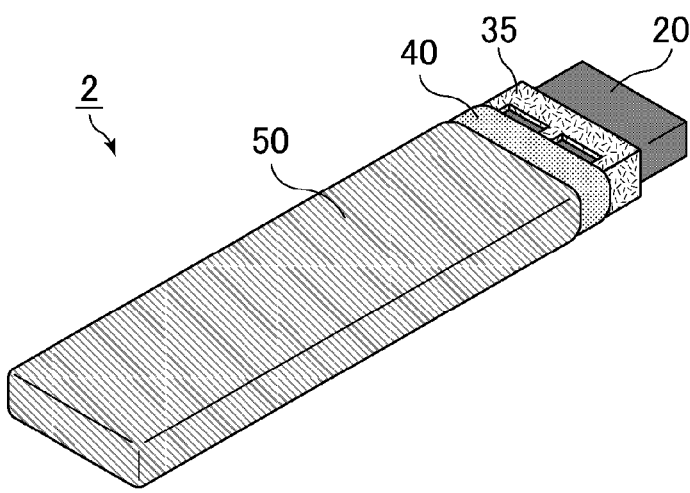
FIG. 3 is a schematic perspective view of another example of the solid electrolytic capacitor element according to preferred embodiments of the present invention.

FIG. 3 is a schematic perspective view of another example of a solid electrolytic capacitor element according to preferred embodiments of the present invention.

In a solid electrolytic capacitor element 2 illustrated in FIG. 3, the exposed region 35 does not divide the masking members 35 from each other. The exposed region 35 has a dot shape and is formed around a valve metal substrate having a dielectric layer 20 formed on surfaces thereof.

In the solid electrolytic capacitor element according to preferred embodiments of the present invention, the masking region is preferably provided on and around surfaces of the valve metal substrate or surfaces of the dielectric layer formed on the valve metal substrate. More preferably, the masking region is provided all around in a direction substantially orthogonal to a long axis direction of the valve metal substrate (hereinafter this direction may be referred to as a circumferential direction of the valve metal substrate).

In the solid electrolytic capacitor element according to preferred embodiments of the present invention, the shape of the exposed region is not particularly limited. For example, the exposed region may have a ring shape as illustrated in FIG. 2 or a dot shape as illustrated in FIG. 3. An exposed region having a ring shape refers to an exposed region continuously formed around the valve metal substrate. A dot-shaped exposed region refers to an exposed region that is discontinuously formed around the valve metal substrate. Of these, a dot-shaped exposed region is preferred. A dot-shaped exposed region that includes exposed portions substantially equally spaced from each other in a circumferential direction is more preferable.

The width of the exposed region (the length in a direction parallel to the long axis direction of the valve metal substrate) is not particularly limited and is preferably 20% or more and 35% or less of the width of the masking region.

In the solid electrolytic capacitor element 1 illustrated in FIGS. 1 and 2, one ring-shaped exposed region is provided at one position. Alternatively, in the solid electrolytic capacitor element according to preferred embodiments of the present invention, exposed regions spaced from each other in the long axis direction of the valve metal substrate may be provided at two or more positions. In such a case, the shapes of the exposed regions are not limited to a ring shape. As illustrated in FIG. 3, dot-shaped exposed regions may be provided at two or more positions in the long axis direction of the valve metal substrate. Alternatively, exposed regions having different shapes may be provided at two or more positions in the long axis direction of the valve metal substrate.

The height of the masking member of the solid electrolytic capacitor element according to preferred embodiments of the present invention is not particularly limited but is preferably about 50 µm or less. The height of the masking member constituting the first coating region may be the same as or different from the height of the masking member constituting the second coating region.

For the purposes of the specification, the height of the masking member refers to a height from a surface of a dielectric layer on which the masking member is formed to a surface of the masking member. When the surfaces of the valve metal substrate have a porous layer, the penetration depth of the masking member penetrating the interior of the porous layer is excluded from the height of the masking member.

Examples of the material for the masking member of the solid electrolytic capacitor element according to preferred embodiments of the present invention include insulating resins such as polyphenylsulfone resins, polyether sulfone resins, cyanate ester resins, fluororesins (tetrafluoroethylene, tetrafluoroethylene-perfluoroalkyl vinyl ether copolymers, etc.), polyimide resins, polyamide imide resins, and derivatives, precursors, etc., of these resins.

Figure 8:
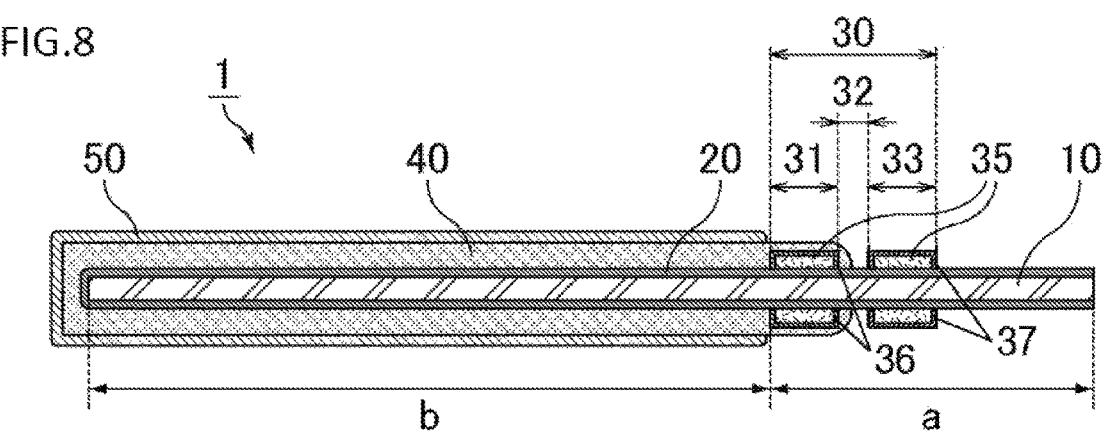
FIG. 8 is a schematic cross-sectional view of another example of a solid electrolytic capacitor element according to preferred embodiments of the present invention.

As illustrated in FIG. 8, among the masking region, the surface of the masking member that constitutes the first coating region is preferably provided with a hydrophilic member 36. The hydrophilic member 36 is preferably at least one selected from the group consisting of a silane coupling agent, a metal chelating agent, and a wetting agent.

The silane coupling agent is preferably at least one selected from the group consisting of 3-glycidyloxypropyltrimethoxysilane and 3-aminopropyltrimethoxysilane.

The metal chelating agent is preferably at least one selected from the group consisting of 8-quinolinol, 1,2,3-benzotriazole, and 1,3-diphenyl-1,3-propanedione.

As illustrated in FIG. 8, among the masking region, the surface of the masking member constituting the second coating region is preferably provided with a hydrophobic member 37. Examples of the hydrophobic member 37 includes epoxy resins, polyimide resins, polyester resins, and silicone.

The valve metal substrate, the dielectric layer, the solid electrolyte layer, and the current collector layer that constitute the solid electrolytic capacitor element according to preferred embodiments of the present invention will now be described.

The valve metal substrate of the solid electrolytic capacitor element according to preferred embodiments of the present invention is formed of a valve metal that has a valve action. Examples of the valve metal include single element metals such as aluminum, tantalum, niobium, titanium, and zirconium, and alloys that contain these metals. Among these, aluminum and aluminum alloys are preferable.

In the solid electrolytic capacitor element according to preferred embodiments of the present invention, the valve metal substrate preferably has a flat-plate shape and more preferably has a foil shape. The surfaces of the valve metal substrate are preferably provided with a porous layer such as an etching layer. When the valve metal substrate has a porous layer, the surface area of the valve metal substrate that functions as an anode is increased, and thus the capacitance of the capacitor can be increased.

In the solid electrolytic capacitor element according to preferred embodiments of the present invention, the dielectric layer preferably includes an oxide coating film formed of the valve metal. For example, when an aluminum foil is used as the valve metal substrate, an oxide coating film can be formed by oxidizing the aluminum foil in an aqueous solution that contains boric acid, phosphoric acid, adipic acid, or a sodium or ammonium salt thereof, for example.

In the solid electrolytic capacitor element according to preferred embodiments of the present invention, the solid electrolyte layer is formed in the first coating region and at least a portion of the exposed region among the masking region. The solid electrolyte layer may be formed over the entire exposed region and may be formed in part of the second coating region. The solid electrolyte layer is also formed on the dielectric layer on the cathode-forming region.

In the solid electrolytic capacitor element according to preferred embodiments of the present invention, the solid electrolyte layer formed on the masking region is preferably at least partly left uncovered with the current collector layer and exposed.

In the solid electrolytic capacitor element according to preferred embodiments of the present invention, the entirety of the solid electrolyte layer formed on the dielectric layer on the cathode-forming region is preferably covered with the current collector layer.

When the valve metal substrate has a porous layer, the solid electrolyte layer preferably includes an inner layer penetrating the porous layer of the valve metal substrate, and an outer layer that covers an outer portion of the inner layer. The inner layer and the outer layer may have the same composition or different compositions.

Examples of the material that constitutes the solid electrolyte layer include conductive polymers having pyrrole, thiophene, or aniline skeletons. Example of the conductive polymer that has a thiophene skeleton include poly(3,4-ethylenedioxythiophene) (PEDOT). PEDOT may be combined with a dopant, polystyrene sulfonic acid (PSS) to form poly(3,4-ethylenedioxythiophene) polystyrene sulfonate (PEDOT:PSS).

In the solid electrolytic capacitor element according to preferred embodiments of the present invention, the current collector layer formed on the solid electrolyte layer preferably includes a carbon layer, which functions as a base layer, and a silver layer on the carbon layer. The current collector layer may include a carbon layer only or a silver layer only.

Method for Producing Solid Electrolytic Capacitor Element

A method for producing a solid electrolytic capacitor element according to preferred embodiments of the present invention will now be described.

The method for producing a solid electrolytic capacitor element according to preferred embodiments of the present invention includes a step of forming a dielectric layer on surfaces of a valve metal substrate; a step of forming a masking region that includes a masking member on the valve metal substrate so as to partition the valve metal substrate into an anode terminal region and a cathode-forming region; a step of forming a solid electrolyte layer on a portion of the masking region and on the dielectric layer; and a step of forming a current collector layer on the solid electrolyte layer. In the step of forming a masking region, an exposed region where the dielectric layer is exposed is formed in a region other than end portions of the masking region. In the step of forming a solid electrolyte layer, the solid electrolyte layer is formed on a region that extends from the boundary between the anode terminal region and the cathode-forming region to at least a portion of the exposed region among the masking region.

FIGS. 4A to 4D are schematic cross-sectional views of an example of the method for producing a solid electrolytic capacitor element according to preferred embodiments of the present invention.

An example of the method for producing a solid electrolytic capacitor element according to preferred embodiments of the present invention is described below with reference to FIGS. 4A to 4D.

Figure 4A:
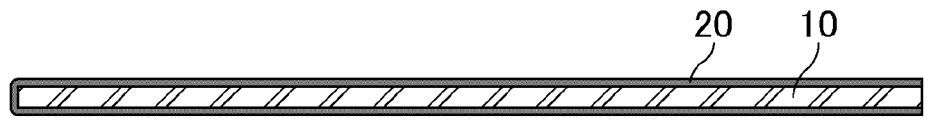
FIGS. 4A to 4D are schematic cross-sectional views illustrating an example of a method for producing a solid electrolytic capacitor element according to preferred embodiments of the present invention.

First, as illustrated in FIG. 4A, a dielectric layer 20 is formed on surfaces of a valve metal substrate 10. For example, a dielectric layer formed of an oxide coating film can be formed by anodizing (also known as chemical conversion) surfaces of the valve metal substrate, such as an aluminum foil, in an ammonium adipate aqueous solution.

Figure 4B:
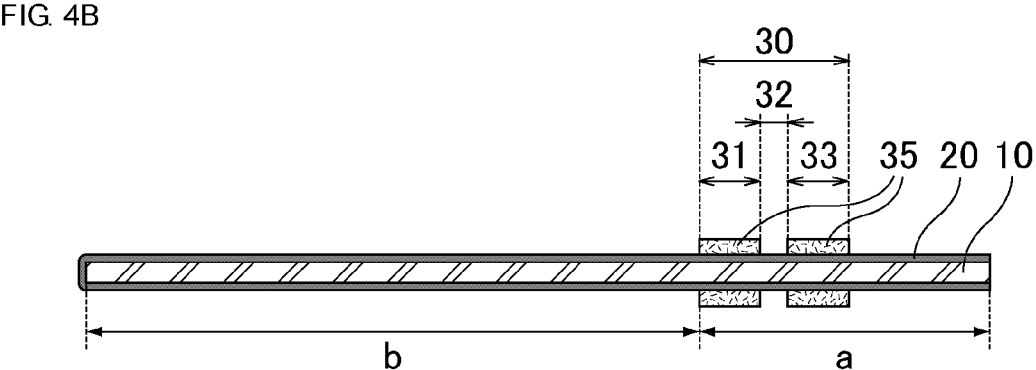

Next, as illustrated in FIG. 4B, a masking region 30 that includes masking members 35 is formed on the valve metal substrate 10 to partition between an anode terminal region and a cathode-forming region. In the preferred embodiments of the present invention, the portion where the masking region 30 is formed is assumed to be the anode terminal region. At this stage, the portion where the masking region 30 is not provided can become either an anode terminal region or a cathode-forming region.

However, typically, a large-area portion is assumed to be the cathode-forming region, and a small-area portion is assumed to be the anode terminal region. In the descriptions below, a region that includes the masking region 30 and the region on the right side of the masking region 30 illustrated in FIG. 4B is assumed to be the anode terminal region (region indicated by double-headed arrow a in FIG. 4B), and a region that includes the region on the left side of the masking region 30 is assumed to be the cathode-forming region (region indicated by double-heated arrow b in FIG. 4B).

In the step of forming the masking region 30, an exposed region where the dielectric layer is exposed is formed in a region other than end portions of the masking region 30. As a result, for example, as illustrated in FIG. 4B, the masking region 30 includes coating regions (first coating region 31 and second coating region 33) that include the masking members 35, and an exposed region (exposed region 32) where the dielectric layer 20 is exposed.

The method for forming a masking region on the anode terminal region is not particularly limited. For example, an insulating resin that functions as a masking member may be applied to the anode terminal region, heated as needed, and dried.

Examples of the technique for applying the insulating resin include an inkjet technique, a screen printing technique, a dispenser technique, a transfer technique, and other known techniques.

There is no need to form the dielectric layer over the entire surfaces of the valve metal substrate as long as the dielectric layer is formed on the cathode-forming region of the valve metal substrate and the exposed region among the masking region. As long as the dielectric layer is formed in these regions, the order in which the step of forming a dielectric layer on surfaces of the valve metal substrate and the step of forming a masking region are performed is not particularly limited. In other words, the masking region may be formed after the dielectric layer is formed on surfaces of the valve metal substrate. Alternatively, the dielectric layer may be formed after the masking region is formed on surfaces of the valve metal substrate.

A chemically converted foil preliminarily subjected to a chemical conversion treatment may be used as the valve metal substrate. When a chemically converted foil is used, the foil needs to be cut into a particular shape before actual use; thus, cut ends that do not have the oxide coating film are exposed. Thus, even when a chemically converted foil is used, a treatment known as "cut end chemical conversion" that involves forming an oxide coating film on surfaces of the valve metal substrate including the cut ends needs to be performed. The cut end chemical conversion is also included in the step of forming a dielectric layer on surfaces of the valve metal substrate according to preferred embodiments of the present invention.

Figure 4C:
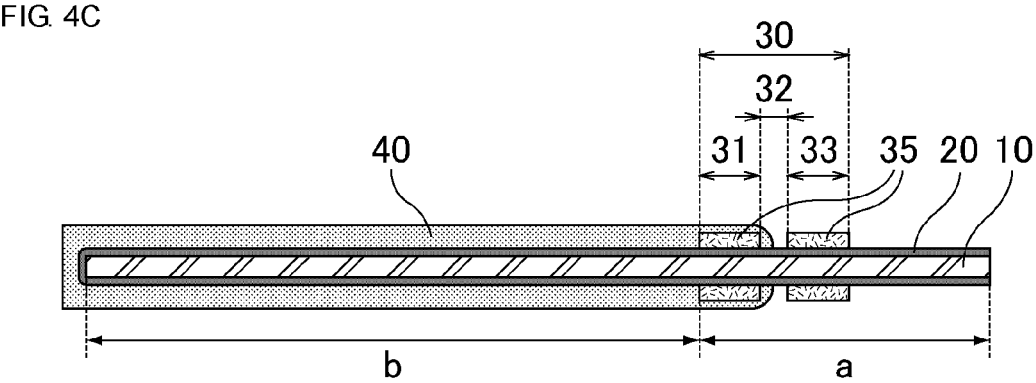

Next, as illustrated in FIG. 4C, a solid electrolyte layer 40 is formed so as to cover the entirety of the dielectric layer 20 in the cathode-forming region, and, among the masking region 30, the entirety of the first coating region 31 and at least a portion of the exposed region 32.

Examples of the method for forming the solid electrolyte layer include a method that involves providing a dispersion (also known as a conductive polymer solution), which contains a conductive polymer dispersed therein, to the dielectric layer, and drying the solution; and a method that involves providing a solution (also known as a conductive monomer solution), which contains a monomer that forms a conductive polymer, to the dielectric layer, and inducing polymerization.

The technique of providing the conductive polymer solution or the conductive monomer solution to the dielectric layer is not particularly limited. Examples of the technique include a technique of applying a conductive polymer solution or a conductive monomer solution to the dielectric layer, and a technique of immersing a cathode-forming-region-side end portion of a valve metal substrate, which has a dielectric layer and a masking region formed on surfaces thereof, in a conductive polymer solution or a conductive monomer solution down to a particular depth.

Figure 7A:
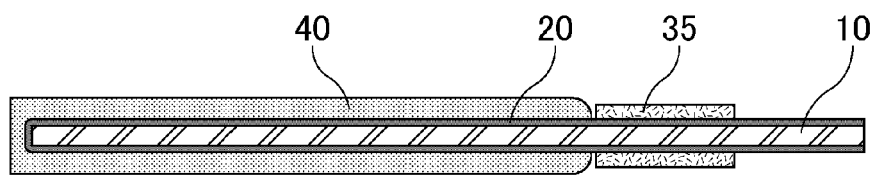
FIGS. 7A and 7B are schematic cross-sectional views of an example of a solid electrolytic capacitor element included in a solid electrolytic capacitor according to a related art.
Figure 7B:
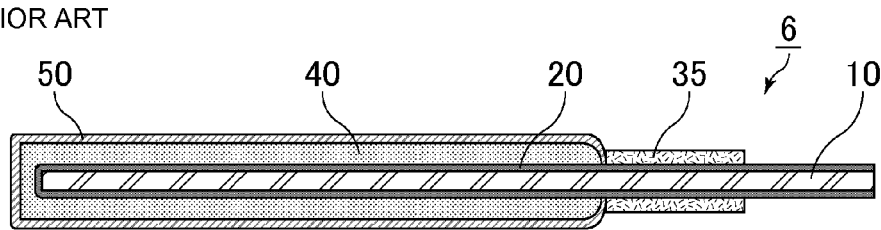

For example, referring to FIG. 4C, when the valve metal substrate 10 is immersed in a conductive polymer solution or a conductive monomer solution such that a portion that extends from the cathode-forming region b-side end portion to the midpoint of the second coating region 33 is immersed in the solution, the masking member 35 that constitutes the second coating region 33 may repel the conductive polymer solution or the conductive monomer solution. However, in such cases also, the conductive polymer solution or the conductive monomer solution is retained on the exposed region 32 where the dielectric layer 20 is exposed. As a result, a solid electrolyte layer is sufficiently formed on the first coating region 31, and a gap, such as one illustrated in FIG. 7A, will not be formed between the first coating region 31 and the solid electrolyte layer 40.

Figure 4D:
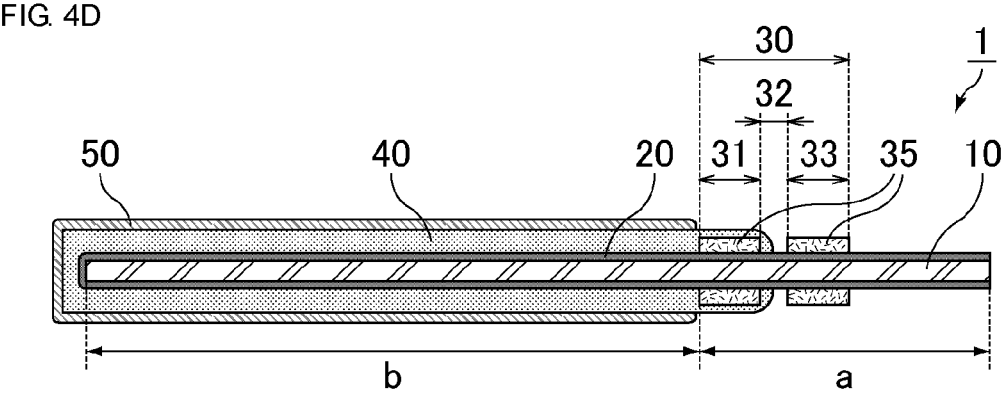

Then, as illustrated in FIG. 4D, a current collector layer 50 is formed on the solid electrolyte layer 40. In FIG. 4D, the current collector layer 50 is formed only on the solid electrolyte layer 40 on the cathode-forming region b.

In the method for producing a solid electrolytic capacitor element according to preferred embodiments of the present invention, the current collector layer may be formed on the solid electrolyte layer on the anode terminal region as long as the current collector layer is not formed in the exposed region where the dielectric layer is exposed. Preferably, the solid electrolyte layer formed on the masking region is at least partly left uncovered with the current collector layer and exposed.

In the method for producing a solid electrolytic capacitor element according to preferred embodiments of the present invention, the entirety of the solid electrolyte layer formed on the dielectric layer on the cathode-forming region is preferably covered with the current collector layer.

The step of forming a masking region will now be described in further detail.

Figure 5A:
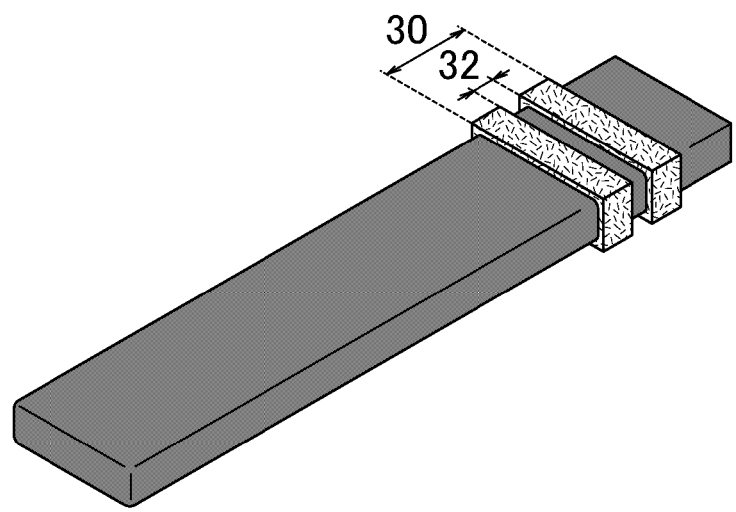
FIGS. 5A and 5B are schematic perspective views of examples of the shape of a masking region formed in a step of forming a masking region.
Figure 5B:
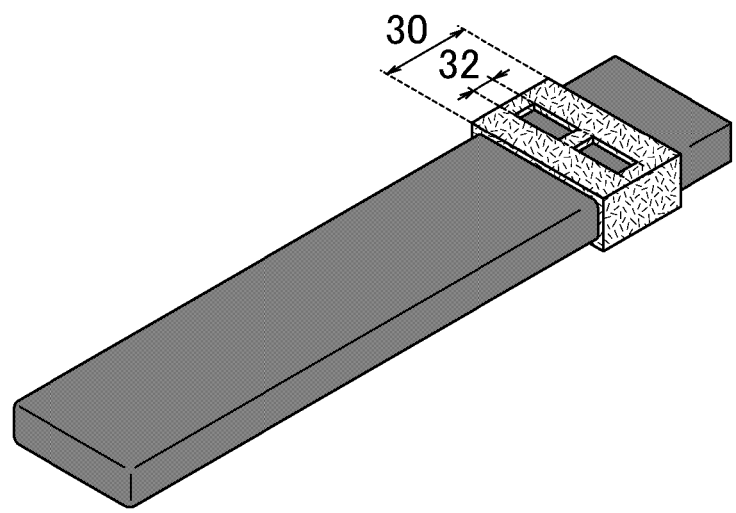

FIGS. 5A and 5B are schematic perspective views of examples of the shapes of the masking region formed in the step of forming a masking region.

As has been described in the section "Solid electrolytic capacitor element", the shape of the masking region, in particular, formation of the exposed region, is not particularly limited. For example, a masking region 30 that has a ring-shaped exposed region 32 illustrated in FIG. 5A, a masking region 30 that has a dot-shaped exposed region 32 illustrated in FIG. 5B, or the like may be formed.

The size of the exposed region and the like, the height of the masking member, the material for the masking member and the like, are the same as those described in the section "Solid electrolytic capacitor element".

In the method for producing a solid electrolytic capacitor element according to preferred embodiments of the present invention, after the step of forming a masking region, a hydrophilic member 36 may be provided to the surface of the masking member that constitutes a coating region formed on the cathode-forming-region-side of the exposed region. The hydrophilic member 36 described in the section "Solid electrolytic capacitor element" can be used as the hydrophilic member 36.

In the method for producing a solid electrolytic capacitor element according to preferred embodiments of the present invention, after the step of forming a masking region, a hydrophobic member 37 may be provided to the surface of the masking member that constitutes a coating region formed on the anode-terminal-region-side of the exposed region. The hydrophobic member 37 described in the section "Solid electrolytic capacitor element" can be used as the hydrophobic member 37.

Solid Electrolytic Capacitor

A solid electrolytic capacitor according to preferred embodiments of the present invention will now be described.

The solid electrolytic capacitor according to preferred embodiments of the present invention includes the solid electrolytic capacitor element described in the section "Solid electrolytic capacitor element". The solid electrolytic capacitor element is sealed with a packaging resin. When the solid electrolytic capacitor according to preferred embodiments of the present invention includes two or more solid electrolytic capacitor elements, solid electrolytic capacitor elements other than the solid electrolytic capacitor element described in the section "Solid electrolytic capacitor element" may be included.

Figure 6:
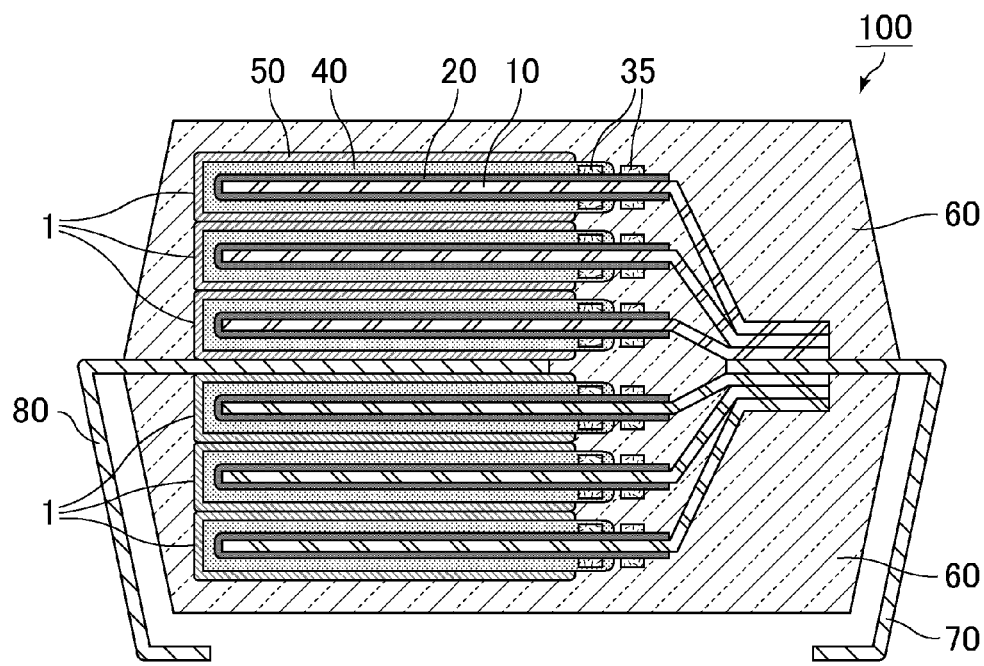
FIG. 6 is a schematic cross-sectional view of an example of a solid electrolytic capacitor according to preferred embodiments of the present invention.

FIG. 6 is a schematic cross-sectional view of an example of a solid electrolytic capacitor according to preferred embodiments of the present invention.

A solid electrolytic capacitor 100 illustrated in FIG. 6 includes solid electrolytic capacitor elements 1 (hereinafter may be simply referred to as capacitor elements 1), an anode terminal 70 (a lead frame on the anode side), a cathode terminal 80 (a lead frame on the cathode side), and a packaging resin 60.

The packaging resin 60 covers the entireties of the capacitor elements 1, part of the anode terminal 70, and part of the cathode terminal 80. An example of the material for the packaging resin 60 is an epoxy resin.

Method for Producing Solid Electrolytic Capacitor

A method for producing s solid electrolytic capacitor according to preferred embodiments of the present invention will now be described.

In the method for producing a solid electrolytic capacitor according to preferred embodiments of the present invention, solid electrolytic capacitor elements are prepared by the method described in the section "Method for producing solid electrolytic capacitor element", and the solid electrolytic capacitor elements are sealed with a packaging resin.

The solid electrolytic capacitor is preferably prepared as follows.

First, one or more solid electrolytic capacitor elements are prepared by the method described in the section "Method for producing solid electrolytic capacitor element".

In preparing a solid electrolytic capacitor that includes multiple solid electrolytic capacitor elements, solid electrolytic capacitor elements are stacked. In the process, the solid electrolytic capacitor elements are stacked so that the anode terminal regions of the valve metal substrates oppose each other. The anode terminal regions are joined with one another, and the anode terminal is joined to the anode terminal regions. Examples of the joining technique include welding and pressure bonding. The elements are also stacked so that portions that correspond to the current collector layers are in contact with each other, and the cathode terminal is joined to the current collector layers. As a result, the current collectors become electrically coupled to one another. Coupling between the current collector electrodes and joining between current collector layers and the cathode terminal are done by using a conductive adhesive, for example.

Subsequently, sealing is performed with a packaging resin so that the packaging resin covers the entireties of the capacitor elements, part of the cathode terminal, and part of the anode terminal. The packaging resin is, for example, formed by transfer molding. As a result, a solid electrolytic capacitor is obtained.

EXAMPLES

Examples of specific disclosure of the solid electrolytic capacitor element and the solid electrolytic capacitor according to preferred embodiments of the present invention will now be described. It is to be understood that the present invention is not limited to the following examples.

Example 1

First, a chemically converted aluminum foil having a porous layer on its surfaces was prepared as a valve metal substrate, and cut into a predetermined shape.

Next, a strip-shaped masking member was applied at each of two positions respectively certain distances away from one end of a chemically converted aluminum foil in a long axis direction so that each strip-shaped masking member was provided all around the circumference of the chemically converted aluminum foil. As a result, the masking members were allowed to penetrate the porous layer, and a masking region that included an exposed region was formed. Among the chemically converted aluminum foil divided by the masking region, a region that contained a small-area portion and the masking region was assumed to be an anode terminal region. The region other than the anode terminal region was assumed to be a cathode-forming region. A polyimide was used as the material for the masking member.

The width of the masking region was about 0.8 mm. The masking region was formed so that a ring-shaped exposed region about 0.2 mm in width was formed substantially at the center portion of the masking region.

The height of the masking member was about 10 μm.

The chemically converted aluminum foil having the masking region formed therein was oxidized in an aqueous ammonium adipate solution to form an aluminum oxide dielectric layer on cut ends.

A region that extends from the cathode-forming-region-side end portion of the chemically converted aluminum foil to the midpoint of the second coating region was immersed in a conductive polymer-containing solution. A PEDOT:PSS dispersion (mixed dispersion containing poly(3,4-ethylenedioxythiophene) and polystyrene sulfonic acid) was used as the conductive polymer-containing solution. After immersing, the foil was dried to form a solid electrolyte layer on the entirety of the cathode-forming region, the entirety of the first coating region, and part of the exposed region.

The cathode-forming region in the surface of the solid electrolyte layer was immersed in carbon paste, followed by drying so as to form a carbon layer. The surface of the carbon layer was immersed in silver paste, followed by drying to form a silver layer. As a result, a solid electrolytic capacitor element was prepared.

Four such solid electrolytic capacitor elements were stacked, exposed portions of the valve metal substrates were joined to an external coupling terminal (anode terminal) by resistance welding, and the silver layers were joined to another external coupling terminal (cathode terminal) with a conductive adhesive. Then sealing was carried out using a packaging resin so as to obtain a solid electrolytic capacitor of Example 1. The obtained solid electrolytic capacitor was about 7.3 mm in length, about 4.3 mm in width, and about 1.9 mm in thickness.

Example 2

Capacitor elements were prepared as in Example 1 except that the shape of the exposed region was changed to a dot shape. As a result, a solid electrolytic capacitor of Example 2 was obtained.

Example 3

Capacitor elements were prepared as in Example 1 except that, after formation of the masking region, 3-glycidyloxypropyltrimethoxysilane, i.e., a silane coupling agent, was applied to the surface of the masking member that constituted the first coating region so as to form a hydrophilic member. As a result, a solid electrolytic capacitor of Example 3 was obtained.

Example 4

Capacitor elements were prepared as in Example 1 except that, after formation of the masking region, 3-aminopropyltrimethoxysilane, i.e., a silane coupling agent, was applied to the surface of the masking member that constituted the first coating region so as to form a hydrophilic member. As a result, a solid electrolytic capacitor of Example 4 was obtained.

Example 5

Capacitor elements were prepared as in Example 1 except that, after formation of the masking region, 8-quinolinol, i.e., a metal chelating agent, was applied to the surface of the masking member that constituted the first coating region so as to form a hydrophilic member. As a result, a solid electrolytic capacitor of Example 5 was obtained.

Example 6

Capacitor elements were prepared as in Example 1 except that, after formation of the masking region, 1,2,3-benzotriazole, i.e., a metal chelating agent, was applied to the surface of the masking member that constituted the first coating region so as to form a hydrophilic member. As a result, a solid electrolytic capacitor of Example 6 was obtained.

Example 7

Capacitor elements were prepared as in Example 1 except that, after formation of the masking region, 1,3-diphenyl-1,3-propanedione, i.e., a metal chelating agent, was applied to the surface of the masking member that constituted the first coating region so as to form a hydrophilic member. As a result, a solid electrolytic capacitor of Example 7 was obtained.

Example 8

Capacitor elements were prepared as in Example 1 except that, after formation of the masking region, a wetting agent (Carbowet 106 produced by Air Products and Chemicals, Inc.) was applied to the surface of the masking member that constituted the first coating region so as to form a hydrophilic member. As a result, a solid electrolytic capacitor of Example 8 was obtained.

Comparative Example 1

Capacitor elements were prepared as in Example 1 except that no exposed region was formed and the entirety of the masking region was covered with a masking member. As a result, a solid electrolytic capacitor of Comparative Example 1 was obtained.

Immersing into the conductive polymer-containing solution, carbon paste, and silver paste was performed down to the same position as in Example 1.

Evaluation of Non-Defective Rate

One thousand solid electrolytic capacitors of each of Examples 1 to 8 and Comparative Example 1 were prepared, and their leak current was evaluated. The capacitors that had leak current of 0.1 CV or more were assumed to be defective in determining the non-defective rate. The results are shown in Table 1.

TABLE 1

| | Exposed region | Hydrophilic member in the first coating region | | Non-defective rate |
|---|---|---|---|---|
| Example 1 | Ring-shaped | None | — | 91.3% |
| Example 2 | Dot-shaped | None | — | 92.3% |
| Example 3 | Ring-shaped | Silane coupling agent | 3-Glycidyloxy-propyl-trimethoxysilane | 95.8% |
| Example 4 | Ring-shaped | Silane coupling agent | 3-Aminopropyl-trimethoxysilane | 96.1% |
| Example 5 | Ring-shaped | Metal chelating agent | 8-Quinolinol | 93.3% |
| Example 6 | Ring-shaped | Metal chelating agent | 1,2,3-Benzotriazole | 94.5% |
| Example 7 | Ring-shaped | Metal chelating agent | 1,3-Diphenyl-1,3-propanedione | 93.7% |
| Example 8 | Ring-shaped | Wetting agent | Carbowet 106 | 94.6% |

TABLE 1-continued

|  | Exposed region | Hydrophilic member in the first coating region | Non-defective rate |
|---|---|---|---|
| Comparative Example 1 | None | None | — 85.3% |

Table 1 shows that solid electrolytic capacitors of all Examples in which the exposed region was formed in the masking region had higher non-defective rates regarding leak current than the solid electrolytic capacitor of Comparative Example 1 in which no exposed region was formed. Moreover, the results of Examples 3 to 8 indicate that forming a hydrophilic member on the surface of the masking member constituting the first coating region further improves the non-defective rate.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A solid electrolytic capacitor element comprising:
a valve metal substrate that has an anode terminal region and a cathode-forming region;
a dielectric layer on the cathode-forming region;
a current collector layer on the solid electrolyte layer; and
a masking member between the anode terminal region and the cathode-forming region and insulating the valve metal substrate from opposite polarity, the masking member including:
a first coating portion;
an exposed region where the dielectric layer is exposed; and
a second coating portion,
wherein the first coating portion, the exposed region, and the second coating portion are arranged in this order starting from a boundary between the anode terminal region and the cathode-forming region towards the anode terminal region; and
a solid electrolyte layer on the dielectric layer and covering the first coating portion and at least a portion of the exposed region.

2. The solid electrolytic capacitor element according to claim 1, wherein the masking member has a height of 50 μm or less.

3. The solid electrolytic capacitor element according to claim 1, further comprising a hydrophilic member provided on a surface of the first coating portion.

4. The solid electrolytic capacitor element according to claim 3, wherein the hydrophilic member contains at least one selected from a silane coupling agent, a metal chelating agent, and a wetting agent.

5. The solid electrolytic capacitor element according to claim 3, wherein the hydrophilic member contains a silane coupling agent, and the silane coupling agent is at least one selected from 3-glycidyloxypropyltrimethoxysilane and 3-aminopropyltrimethoxysilane.

6. The solid electrolytic capacitor element according to claim 3, wherein the hydrophilic member contains a metal chelating agent, and the metal chelating agent is at least one selected from 8-quinolinol, 1,2,3-benzotriazole, and 1,3-diphenyl-1,3-propanedione.

7. The solid electrolytic capacitor element according to claim 1, further comprising a hydrophobic member on a surface of the second coating portion.

8. The solid electrolytic capacitor element according to claim 1, wherein at least a portion of the solid electrolyte layer covering the first coating portion is not covered with the current collector layer.

9. The solid electrolytic capacitor element according to claim 1, wherein an entirety of the solid electrolyte layer that is on the dielectric layer in the cathode-forming region is covered with the current collector layer.

10. A solid electrolytic capacitor comprising:
the solid electrolytic capacitor element according to claim 1; and
a packaging resin that seals the solid electrolytic capacitor element.

* * * * *